United States Patent
Heinzl

(10) Patent No.: US 9,861,935 B2
(45) Date of Patent: Jan. 9, 2018

(54) MEMBRANE DISTILLATION DEVICE

(75) Inventor: Wolfgang Heinzl, Ramerberg (DE)

(73) Assignee: Major Bravo Limited, Tortola (VG)

(*) Notice: Subject to any disclaimer, the term of this patent is extended or adjusted under 35 U.S.C. 154(b) by 930 days.

(21) Appl. No.: 14/235,976

(22) PCT Filed: Jul. 26, 2012

(86) PCT No.: PCT/EP2012/064680
§ 371 (c)(1),
(2), (4) Date: Apr. 8, 2014

(87) PCT Pub. No.: WO2013/017520
PCT Pub. Date: Feb. 7, 2013

(65) Prior Publication Data
US 2014/0216916 A1 Aug. 7, 2014

(30) Foreign Application Priority Data
Jul. 29, 2011 (DE) .................. 10 2011 108 909

(51) Int. Cl.
*C02F 1/04* (2006.01)
*B01D 61/36* (2006.01)
(Continued)

(52) U.S. Cl.
CPC .......... *B01D 61/364* (2013.01); *B01D 61/36* (2013.01); *C02F 1/447* (2013.01);
(Continued)

(58) Field of Classification Search
CPC ...... B01D 61/36; B01D 61/364; B01D 3/146; B01D 3/065; B01D 1/26; C02F 1/447; C02F 1/005; C02F 1/04; C02F 2103/08
See application file for complete search history.

(56) References Cited

U.S. PATENT DOCUMENTS 4,586,985 A * 5/1986 Ciocca .................. B01D 1/222
159/18
6,716,355 B1 4/2004 Hanemaaijer et al.
(Continued)

FOREIGN PATENT DOCUMENTS

DE 10 2010 048 160 A1 4/2012
WO WO 2005089914 A1 * 9/2005 .......... B01D 5/0039
(Continued)

OTHER PUBLICATIONS

English translation of WO 2005089914 A1 obtained from Espacenet.*
International Search Report for International Application No. PCT/EP2012/064680 dated Nov. 5, 2012.

*Primary Examiner* — Jonathan Miller
*Assistant Examiner* — Jonathan Pilcher
(74) *Attorney, Agent, or Firm* — Mintz Levin Cohn Glovsky and Popeo, P.C.; Peter F. Corless; Steven M. Jensen

(57) ABSTRACT

The invention relates to a membrane distillation device, comprising at least one condensation/evaporation stage, which comprises at least one condensation unit and at least one evaporation unit and to which vapor is fed and through which a liquid to be concentrated flows, wherein each condensation unit comprises a first vapor chamber that is bounded at least partially by a condensation wall and to which the fed vapor is supplied and each evaporation unit comprises a second vapor chamber that is bounded at least partially by a vapor-permeable, liquid-tight membrane wall, and in each condensation/evaporation stage at least one flow channel is provided, which is formed between such a condensation unit and such an evaporator unit adjacent to said condensation unit and which conducts the liquid to be concentrated, and thus the liquid to be concentrated is heated by means of the condensation wall, and vapor arising from (Continued)

Figure 1:
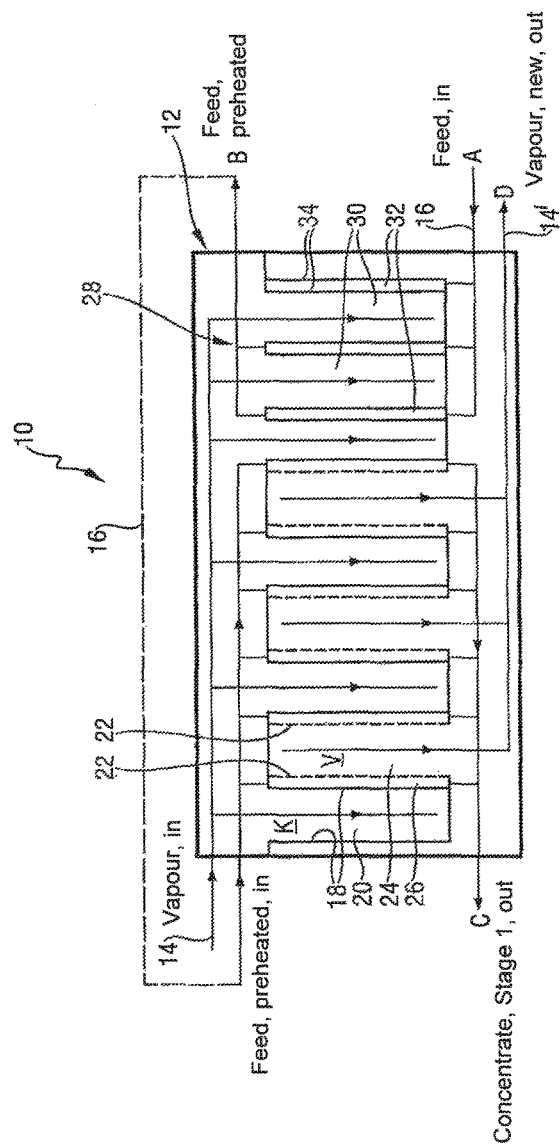

the liquid to be concentrated enters the second vapor chamber through the membrane wall. At least one condensation/evaporation stage is expanded by an integrated apparatus for preheating the liquid to be concentrated, which apparatus comprises at least one additional vapor chamber, to which the vapor fed to the condensation/evaporation stage is supplied and in which the vapor is condensed, whereby the liquid to be concentrated is preheated.

11 Claims, 6 Drawing Sheets

(51) Int. Cl.
    *C02F 1/44*     (2006.01)
    *C02F 103/08*     (2006.01)
(52) U.S. Cl.
    CPC ...... *B01D 2311/04* (2013.01); *B01D 2313/08* (2013.01); *B01D 2317/022* (2013.01); *B01D 2317/04* (2013.01); *B01D 2317/06* (2013.01); *B01D 2319/022* (2013.01); *B01D 2319/04* (2013.01); *C02F 1/04* (2013.01); *C02F 2103/08* (2013.01)

(56) References Cited

U.S. PATENT DOCUMENTS

| | | | |
|---|---|---|---|
| 8,287,735 B2* | 10/2012 | Hanemaaijer | B01D 1/0035 202/176 |
| 2009/0000939 A1 | 1/2009 | Heinzl | |
| 2010/0072135 A1* | 3/2010 | Hanemaaijer | B01D 1/0035 210/640 |
| 2013/0319923 A1 | 12/2013 | Heinzl | |

FOREIGN PATENT DOCUMENTS

| | | |
|---|---|---|
| WO | 2007/054311 | 5/2007 |
| WO | 2010/127819 | 11/2010 |
| WO | 2012/048788 | 4/2012 |

* cited by examiner

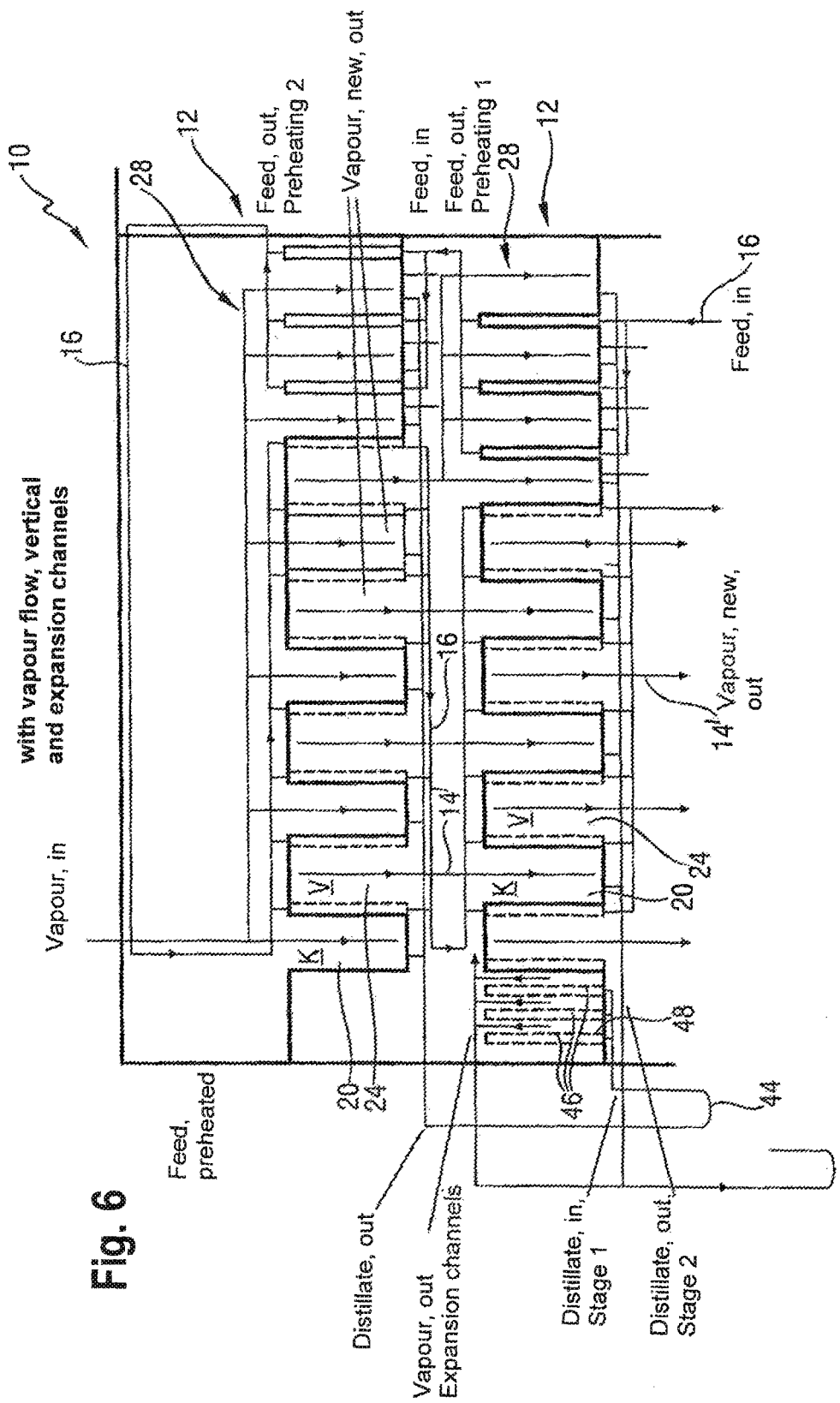

MEMBRANE DISTILLATION DEVICE

CROSS-REFERENCE TO RELATED APPLICATIONS

This application is a National Phase application filed under 35 USC 371 of PCT International Application No. PCT/EP2012/064680 (WO 2013/017520) with an International Filing Date of Jul. 26, 2012, which claims under 35 U.S.C. §119(a) the benefit of German Application No. 10 2011 108 909.1, filed Jul. 29, 2011, the entire contents of which are incorporated herein by reference.

The invention relates to a membrane distillation apparatus comprising a plurality of condensation/evaporation stages which are consecutively flowed through by a liquid to be concentrated (feed) and which each comprise a plurality of condensation units and a plurality of evaporator unit, wherein the first condensation/evaporation unit, viewed in the main direction of flow of the liquid to be concentrated, is acted on by the vapor of a vapor generator and the second condensation/evaporation stage, and optionally every further condensation/evaporation stage is acted on by the vapor produced in the respective preceding condensation/evaporation stage, wherein a respective condensation unit comprises a first vapor space which is bounded at least partly by a condensation wall, and which is acted on by the supplied vapor and a respective evaporation unit comprises a second vapor space which is bounded at least partly by a vapor-permeable, liquid-tight membrane wall, and wherein at least one flow channel is provided in a respective condensation/evaporation stage, which flow channel is formed between such a condensation unit and such an evaporator unit adjacent thereto and conducts the liquid to be concentrated so that the liquid to be concentrated is heated via the condensation wall, and vapor produced from the liquid to be concentrated enters the second vapor space through the membrane wall. In this respect, a vapor generator can be connected upstream of the first condensation/evaporation stage and a condensation stage can be arranged downstream of the last condensation/evaporation stage.

A so-called multi-effect membrane distillation apparatus of this kind is described in WO 2007/054311.

Further conventional membrane distillation apparatus are known from the documents US 2009/0 000 939 A1, WO 2010/127 819 A1 and U.S. Pat. No. 6,716,355 B1.

In a number of thermal processes, the reduction of the energy requirement is of decisive importance for the ensuring of an economic plant operation. The manner in which the liquid or solution to be concentrated is supplied in particular influences the thermal energy requirement of the concentration to a substantial degree in multi-effect desalination plant.

With a membrane distillation apparatus of the named kind serving for multi-effect desalination, for example, the concentration of the solution takes place in stages or effects which follow one another in series. A different temperature and, in equilibrium with this, a different pressure is adopted in each stage when the system is operated free of non-condensable gases.

The temperature is the highest in the vapor generator, whereas it drops continuously toward the condenser.

The solution or liquid to be concentrated is typically at environmental temperature or, as in the desalination of seawater, at seawater temperature. In this respect, the liquid to be concentrated can be preheated in a temperature range of 30 to 40° C., for example on a use of seawater as cooling water of the condenser, and indeed already on exiting the condenser. This temperature is, however, still far away from the temperature in the first condensation/evaporation stage of 80 to 50° C.

If the liquid to be concentration is removed subsequent to the condenser in preheated form as a part flow of the cooling water flow, it is typically supplied to the first condensation/evaporation stage downstream of the vapor generator. Vapor with higher energy is then utilized in this stage to bring the liquid to be concentrated to evaporation temperature. The total system then works at a lower temperature in the first condensation/evaporation stage. The total driving force between the vapor generator and the condenser drops in this respect.

It is substantially the underlying object of the invention to provide an improved membrane distillation apparatus of the initially named kind in which a more effective preheating of the liquid to be concentrated is ensured.

This object is satisfied in accordance with the invention in that each of the condensation/evaporation stages is respectively expanded by an integrated device for preheating the liquid to be concentrated which comprises a plurality of third vapor spaces spaced apart from the first vapor spaces which third vapor spaces are acted on by vapor supplied from the respective condensation/evaporation stage and in which the vapor condenses, whereby the liquid to be concentrated is preheated. Each of the condensation/evaporation stages is respectively acted on by vapor via a horizontal collector channel. The horizontal collector channel is configured such that it applies the vapor both to the first vapor spaces and to the third vapor spaces of the respective condensation/evaporation stage.

A considerably more effective preheating of the liquid to be concentrated is achieved on the basis of this design.

Each preheating device preferably comprises a plurality of channels conducting the liquid to be concentrated which are each bounded at least partly by at least one heat-conductive, liquid-tight wall. In this respect, the vapor supplied to the third vapor spaces of the respective preheating device can condense at the heat-conductive, liquid-tight walls of the channels conducting the liquid to be preheated and concentrated.

At least one heat-conductive, liquid-tight wall is advantageously provided in the form of a planar surface, of a pipe or of a hollow fiber.

It is of advantage if the liquid to be preheated and concentrated is first supplied to the preheating device of the last condensation/evaporation stage, viewed in the main direction of flow of the liquid to be concentrated, and is subsequently supplied consecutively to the preheating device of the respective preceding condensation stage/evaporation stage before the preheated liquid to be concentrated is supplied to the at least one flow channel of the first condensation/evaporation stage conducting the liquid to be concentrated.

The first preheating device does not necessarily, however, have to be provided in the last condensation stage/evaporation stage.

The first condensation/evaporation stage, viewed in the main direction of flow of the liquid to be concentrated, is preferably acted on by the vapor of a vapor generator. In this respect, this vapor can also originate, for example, from external, e.g. from a steam turbine.

For example, a plurality of condensation/evaporation stages arranged horizontally next to eon another and/or a plurality of condensation/evaporation stages arranged vertically beneath one another can be provided.

The first condensation/evaporation stage, viewed in the main direction of flow of the liquid to be concentrated, is preferably acted on by the vapor of a vapor generator via a horizontal collector channel.

If a plurality of condensation/evaporation stages arranged vertically beneath one another are provided, the vapor produced in a respective preceding condensation/evaporation stage is preferably supplied to the respective subsequent condensation/evaporation stage via parallel horizontal collector channels which are connected to one another by a vertical deflection channel section.

In accordance with an alternative advantageous embodiment having a plurality of condensation/evaporation stages arranged vertically beneath one another, the vapor produced in a respective preceding condensation/evaporation stage can also be supplied vertically to the respective subsequent condensation/evaporation stage.

The collected condensate produced in the condensation units of a respective preceding condensation/evaporation stage is preferably supplied via a pressure equalization device to the respective subsequent condensation/evaporation stage.

If a plurality of condensation/evaporation stages arranged vertically beneath one another are provided, the pressure equalization device can in particular comprise a siphon.

In this respect, the rising part of such a siphon advantageously comprises expansion channels which are bounded by at least one membrane.

In this respect, the distillate can flow from below through the expansion channels which form the or a part of the rising siphon. The expansion channels are expediently at the pressure of the respective subsequent condensation/evaporation stage so that the distillate from the respective preceding stage, in which a higher pressure is present than in the following stage, can expand abruptly while forming vapor. The vapor can then flow through the membrane into the vapor space of the subsequent condensation/evaporation stage and does not have to flow off upwardly as in a pipe. A siphoning empty of the siphon by vapor bubbles as in a pipe therefore does not take place. The produced vapor condenses in the condensation channels or condensation units of the subsequent stage.

The inert gases are expediently removed from each condensation/evaporation stage and from the condenser at the dead end of the channels for the incoming vapor.

As mentioned, siphons can be used for the pressure separation between two consecutive condensation/evaporation stages. Such siphons can be provided as membrane frames, for example. The higher pressure is present at the downwardly flowing side of the siphon, whereas the lower pressure is present at the upwardly flowing side of the siphon. The process is operated at the boiling temperature in both stages. A spontaneous boiling of the liquid is now produced in the upwardly flowing portion of the siphon. If the diameter is configured as too small, the boiling bubbles siphon off the rising portion like a mammoth pump. A pressure short-circuit occurs between the stages. Now the whole rising length in the rising part of the siphon, or e.g. the upper part, can be replaced with frames having channels which are bounded by a membrane at at least one side. The vapor produced on the expansion of the liquid can escape directly into the vapor space of the subsequent stage via the membrane and does not has to rise as in a pipe completely upwardly in the pipe.

The liquid to be preheated and concentrated enters into a respective condensation/evaporation stage and is heated by the vapor entering into this stage. The process runs in a self-regulating manner since there is only a temperature difference between the liquid to be preheated and the vapor for as long as only flows into the preheating channels.

The membrane distillation apparatus can be designed at least in part as a modular flow system having a plurality of frame elements, with the different functional units in particular being able to be a respective condensation unit, a respective evaporator unit, a respective heating unit of the vapor generator, a respective cooling unit of the condenser, a respective further vapor space as well as a respective preheating channel of the preheating device, a respective expansion channel of a siphon, etc. each in the form of such a frame element. The frame elements can be provided with web structures via which they can in particular be connected to one another for forming the evaporator, a respective condensation/evaporation stage and the condensation stage, etc. The frame elements can each comprise an inner region which is surrounded by an outer frame and which is preferably provided with an in particular grid-like spacer on whose two sides a respective functional surface, preferably a film or membrane, can in particular be applied in particular for forming a respective vapor space, a respective heating fluid space or a respective cooling fluid space, etc.

The multi-effect membrane distillation apparatus can therefore in particular be made up of frame elements at least in part. The frame elements can comprise applied functional surfaces. In particular the following types of frame elements are conceivable: a frame element respectively provided with a membrane at both sides, a frame element respectively provided at both sides with a fluid-tight film, a frame element spanned by a film and having fluid channels. The membrane distillation apparatus in accordance with the invention can be built up, for example, of such frame elements at least in part.

The solution to be concentrated is preferably at the boiling temperature across all stages corresponding to the absolute pressure in the vapor space of a respective adjacent evaporator unit such as is described in WO 2007/0543211 which is herewith included in the disclosure content of the present application.

The vapor entering into the condensation units condenses at the condensation surfaces. The corresponding heat is transferred to the liquid to be concentrated via the respective surface. The vapor produced therein passes through the membrane of the adjacent evaporator unit into its vapor space which communicates with the pressure of the vapor space of the respective condensation unit of the following condensation/evaporation stage.

The web structures via which the individual frame elements can be connected to one another can, for example, be welded web structures or adhesive structures via which the frame elements are welded or bonded to one another. In the case of welded web structures, a friction welding process, a laser welding process and/or a heating element welding process can be used, for example, for connecting the frame elements.

Figure 2:
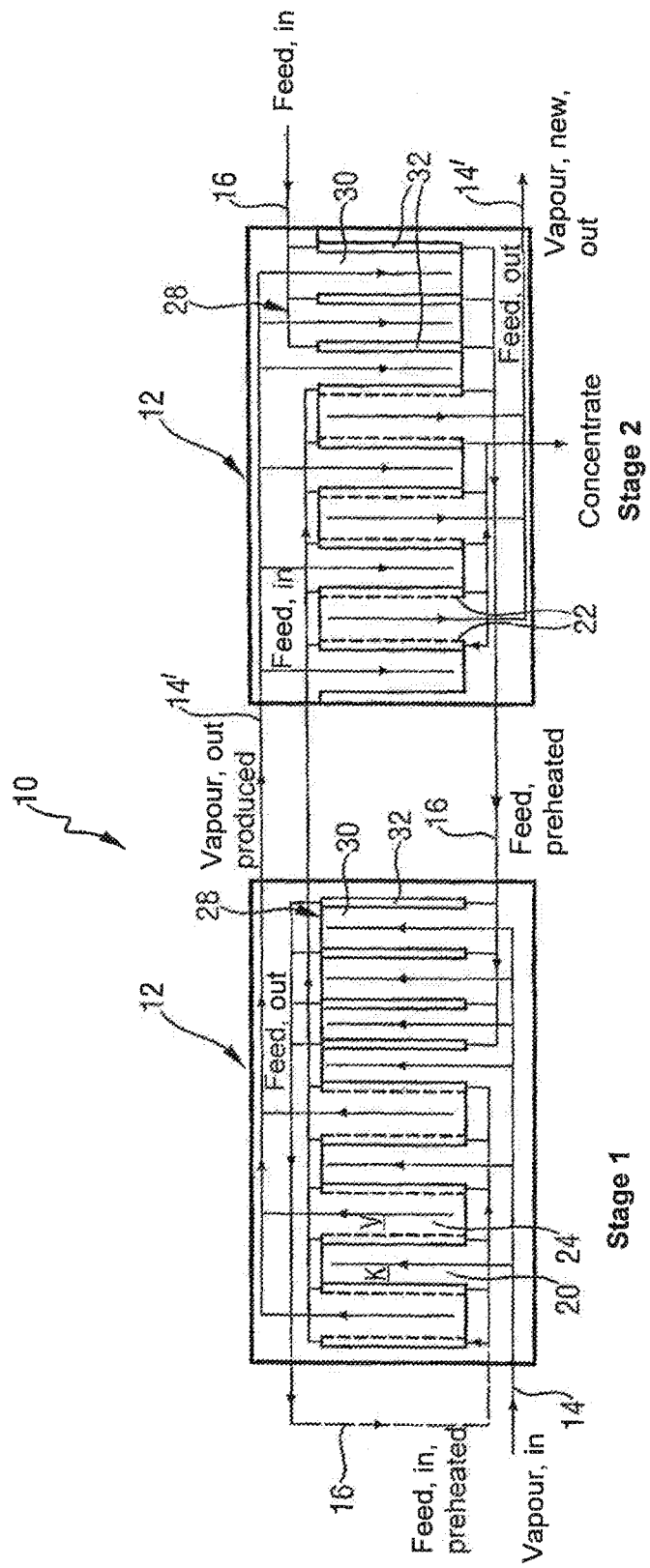
Figure 3:
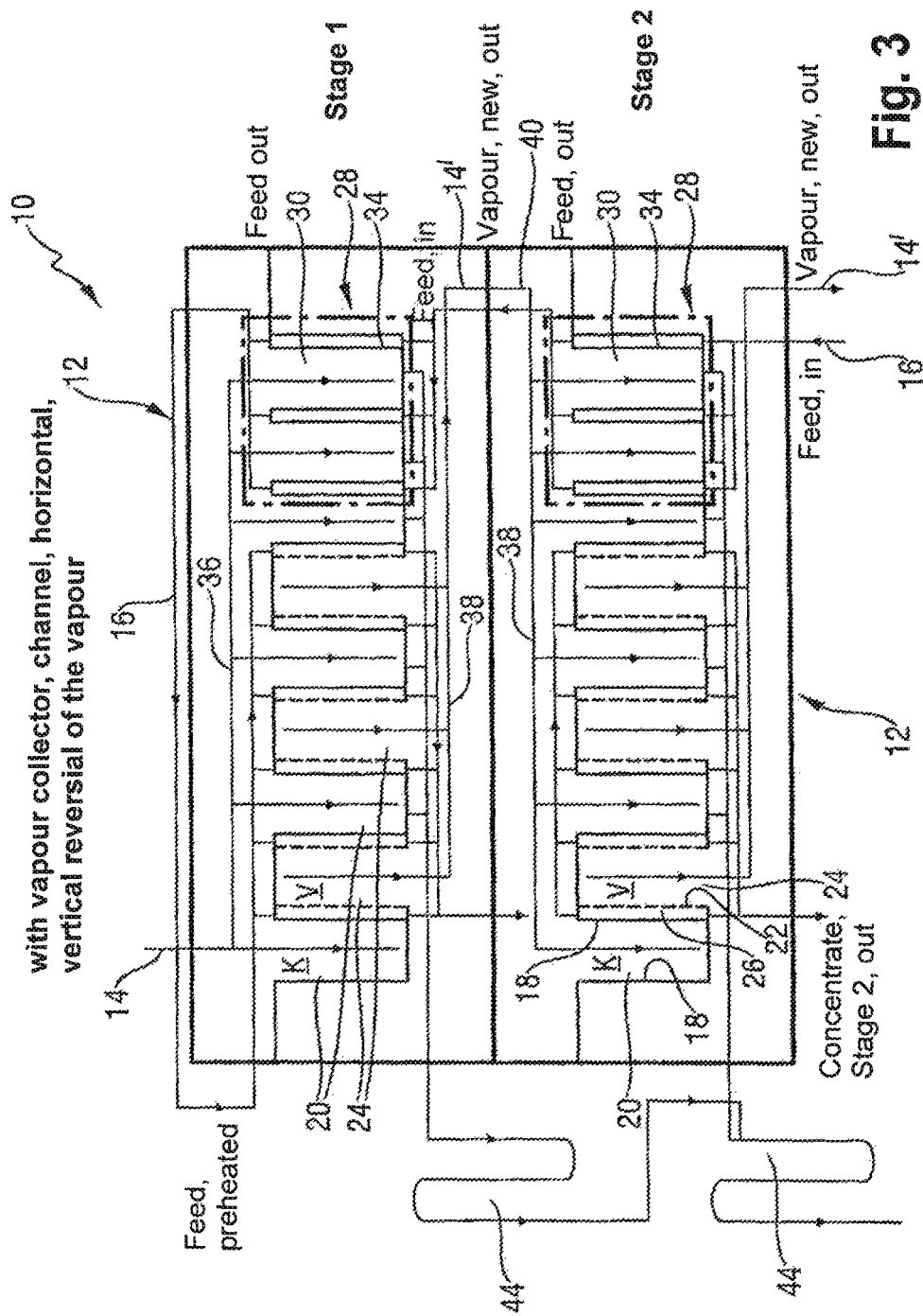
Figure 4:
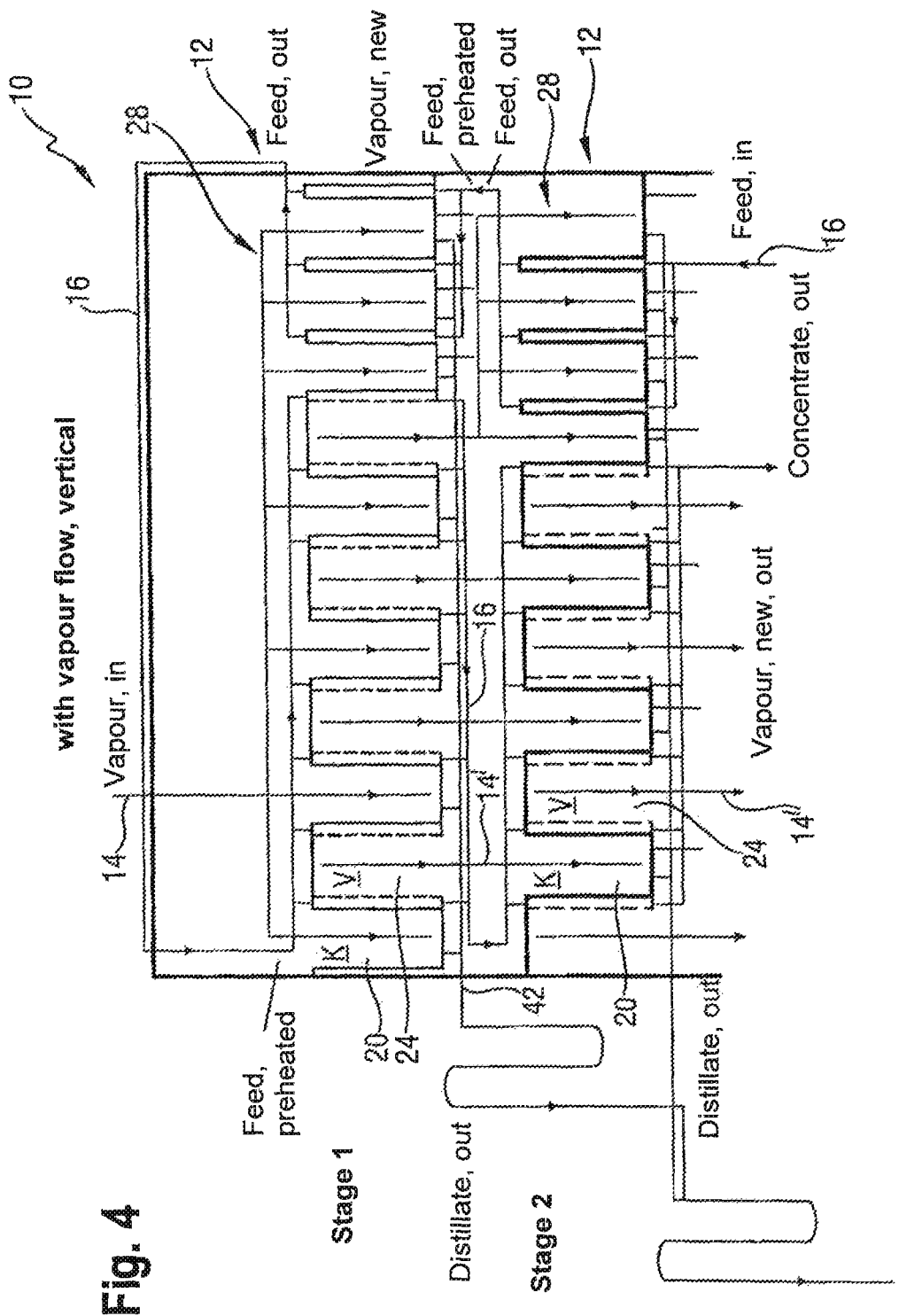
Figure 5:
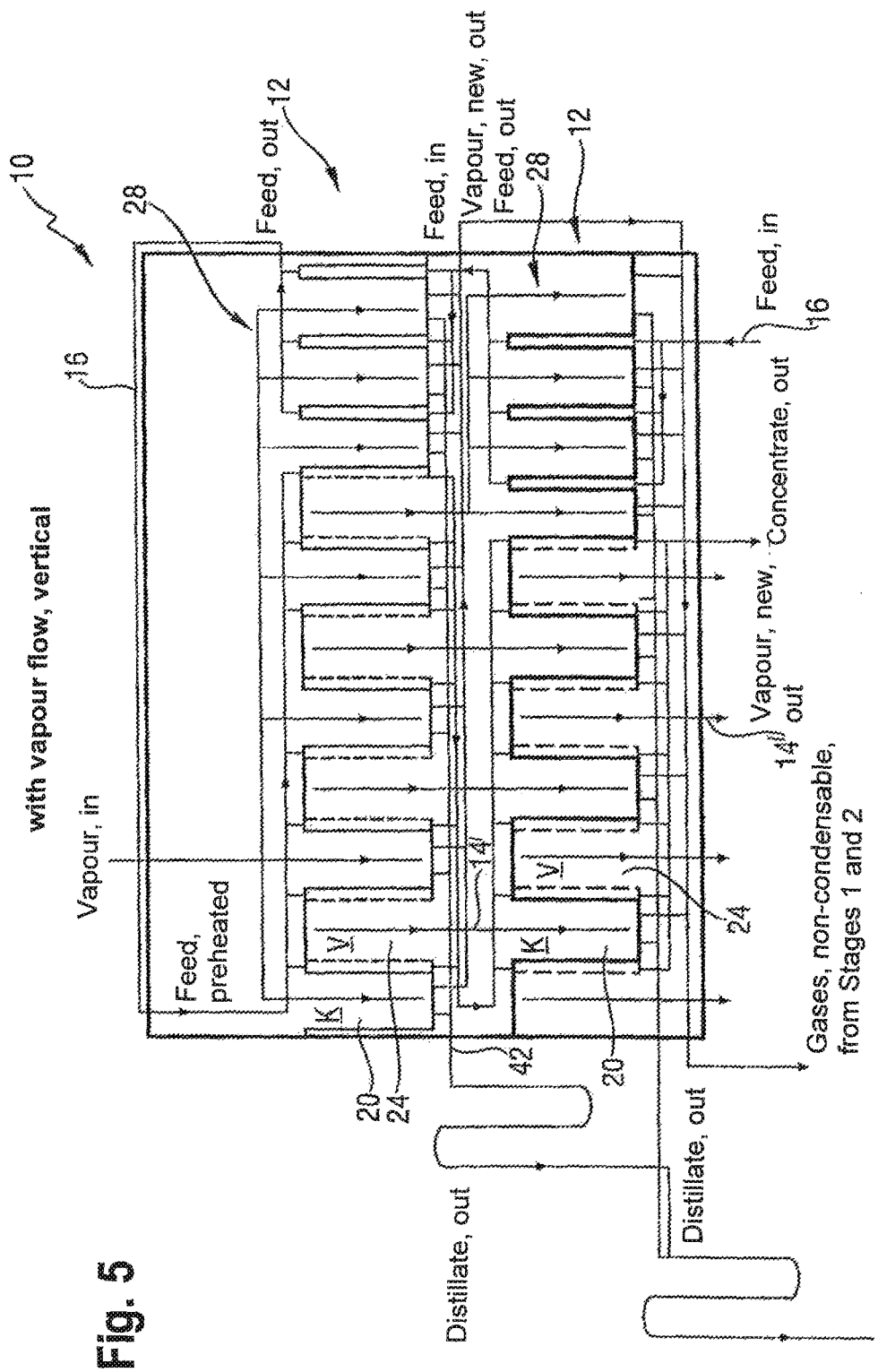

The invention will be explained in more detail in the following with reference to embodiments and to the drawing; there are shown in this:

FIG. 1 a schematic part representation of an exemplary membrane distillation apparatus having a condensation/evaporation stage comprising an integrated preheating device;

FIG. 2 a schematic part representation of an exemplary membrane distillation apparatus having two condensation/evaporation stages arranged horizontally next to one another and each comprising an integrated preheating device;

FIG. 3 a schematic part representation of an exemplary membrane distillation apparatus having two condensation/evaporation stages arranged vertically beneath one another and each comprising an integrated preheating device;

FIG. 4 a schematic part representation of a further exemplary membrane distillation apparatus having two condensation/evaporation stages arranged vertically beneath one another and each comprising an integrated preheating device;

FIG. 5 a schematic part representation of a membrane distillation apparatus comparable with that of FIG. 4, with the disposal of non-condensable gases additionally being shown; and FIG. 6 a schematic part representation of a membrane distillation apparatus comparable with that of FIG. 5, with a siphon whose rising part comprises expansion channels bounded by at least one membrane being provided as a pressure compensation device.

FIG. 1 shows in a schematic part representation an exemplary membrane distillation apparatus 10 having, for example, a condensation/evaporation stage 12 comprising at least one condensation unit K and at least one evaporator unit V. In the present case, a plurality of condensation units and a plurality of evaporator units V are provided.

Vapor 14 from a vapor generator, not shown, is supplied to the condensation/evaporation stage 12 Furthermore, the condensation/evaporation stage 12 is flowed through by a liquid 16 to be concentrated (feed).

In this respect, a respective condensation unit K comprises a first vapor space 20 bounded at least partly by a condensation wall 18 and acted on by the supplied vapor 14 and a respective evaporator unit V comprises a second vapor space 24 bounded at least partly by a vapor-permeable, liquid-tight membrane wall 22. In this respect, at least one flow channel 26 is provided in the condensation/evaporation stage 12, said flow channel being formed between such a condensation unit K and such an evaporator unit V adjacent thereto and conducting the liquid 16 to be concentrated so that the liquid 16 to be concentrated is heated via the condensation wall 18 and vapor 14' produced from the liquid 16 to be concentrated moves through the membrane 22 into the second vapor space 24.

The condensation/evaporation stage 12 is expanded by an integrated device 28 for preheating the liquid to be concentrated. In this respect, this preheating device 28 comprises at least one third vapor space 30 which is acted on by the vapor 14 supplied from the condensation/evaporation stage 12 and into which the vapor 14 condenses, whereby the liquid 16 to be concentrated is preheated. As can be recognized with reference to FIG. 1, a plurality of third vapor spaces 30 are provided in the present case.

The preheating device 28 moreover comprises at least one channel 32 conducting the liquid 16 to be preheated and concentrated which is bounded at least partly by at least one heat-conductive, liquid-tight wall 34. As can be recognized with reference to FIG. 1, a plurality of channels 32 conducting the liquid 32 to be preheated and concentrated are provided.

At least one heat-conductive, liquid-light wall 34 can expediently be provided in the form of a planar surface, of a pipe or of a hollow fiber.

As can be recognized with reference to FIG. 1, the liquid 16 to be preheated and concentrated enters into the condensation/evaporation stage 12 at the point "A" where it is first preheated in the preheating device 28 provided at the end of this stage. The preheated liquid 16 to be concentrated is led out of the preheating device 28 at the point "B" and is supplied back to the condensation/evaporation stage 12 at the inlet side. In this respect, the preheated liquid 16 to be concentrated in particular moves in parallel into the different flow channels 26. The concentrate or the concentrated liquid is then led out of this condensation/evaporation stage 12 at the point "C". The vapor produced in the second vapor spaces 24 is led out of the condensation/evaporation stage 12 at the point "D".

In this condensation/evaporation stage 12 having an integrated preheating device 28, the liquid 16 to be concentrated therefore enters into the stage and is preheated by the vapor likewise entering into the stage. The process is self-regulating since there is only a temperature difference between the liquid to be preheated and the vapor for as long as vapor only flows into the third vapor spaces 30. The liquid 16 to be preheated and concentrated flows in the channels 32 which are bounded by a heat-conductive, liquid-tight wall 34. In this respect, at least one heat-conductive, liquid-tight wall 34 can be provided in the form of a planar surface, of a pipe or of a hollow fiber.

FIGS. 2 to 6 show embodiments of membrane distillation apparatus 10 which each comprise a plurality of condensation/evaporation stages 12 flowed through consecutively by the liquid 16 to be concentrated. In this respect, at least of these stages 12, preferably each of them, is respectively expanded by an integrated device 28 for preheating the liquid 16 to be concentrated.

With these membrane distillation apparatus 10 respectively comprising a plurality of condensation/evaporation stages 12, the liquid 16 to be preheated and concentrated is respectively first supplied to the preheating device 28 of the last condensation/evaporation stage 12, viewed in the main direction of flow of the liquid 16 to be concentrated, and is subsequently supplied consecutively to the preheating device 28 of the respective preceding condensation/evaporation stage 12 before the preheated liquid 16 to be concentrated is supplied to the at least one flow channel 26 of the first condensation/evaporation stage 12 conducting the liquid to be concentrated.

In this respect, the first condensation/evaporation stage 12, viewed in the main direction of flow of the liquid 16 to be concentrated, is respectively acted on by the vapor 14 of a vapor generator. In contrast, the second condensation/evaporation stage 12, and optionally every further condensation/evaporation stage, is acted on by the vapor 14 produced in the respective preceding condensation/evaporation stage 12.

FIG. 2 shows in a schematic part representation an exemplary membrane distillation apparatus 10 having condensation/evaporation stages 12 arranged horizontally next to one another and respectively comprising an integrated preheating device 28. In this respect, condensation and evaporation take place again in each stage, in the second stage, the liquid 16 to be preheated and concentrated flows in channels 32 and is heated by vapor 14' entering from the first stage into the second stage. In this respect, the vapor 14' is the vapor produced anew in the first stage.

The preheated liquid 16 to be concentrated in the second stage flows into the channels 32 of the preheating device 28 associated with the first stage and is further heated by the condensing vapor flowing into this first stage. The preheated liquid 16 to be concentrated can then be supplied to this first stage as liquid to be concentrated by evaporation.

FIG. 3 shows in a schematic part representation an exemplary membrane distillation apparatus 10 having condensation/evaporation stages 12 arranged vertically beneath one another and respectively comprising an integrated preheating device 28.

In the present case, the liquid 16 to be preheated and concentrated is guided from bottom to top through the condensation/evaporation stages 12.

As can be recognized with reference to FIG. 3, the first condensation/evaporation stage 12, viewed in the main direction of flow of the liquid 16 to be concentrated, is acted on via a horizontal collector channel 36 with vapor 14 of the vapor generator. The vapor 14' produced in the upper first condensation/evaporation stage 12 is supplied to the following condensation/evaporation stage arranged thereunder via two horizontal collector channels 38 which are in parallel and which are connected to one another by a vertical deflection section 40.

The respective vapor supplied to the condensation/evaporation stages 12 also enters into the third vapor spaces 30 of the preheating devices 28 associated with these stages 12. As also with the other embodiments, the third vapor spaces 30 of a respective preheating device 28 are respectively at least partly bounded by heat-conductive, liquid-tight condensation walls 34.

As already mentioned, the vapor is deflected via a vertical channel section 40 on the transfer from the upper first stage to the lower second stage. After its horizontal distribution, the vapor entering into the lower second stage enters into the first vapor spaces 20 of the lower second condensation/evaporation stage 12 which are each at least partly bounded by a condensation wall 18. The condensation heat is transferred via the flow channels 26 conducting the liquid 16 to be concentrated and new vapor 14' which enters through the membrane walls 22 into the second vapor spaces 24 is produced through temperature differences and pressure differences.

The condensate produced in the first vapor spaces 20 of the upper first condensation/evaporation stage 12 is collected and supplied to the next condensation/evaporation stage 12 via a pressure equalization device comprising e.g. a siphon 44.

An expansion evaporation of the distillate through pressure differences occurs in the rising part of the siphon 44. Openings for the transporting away of the non-condensable gases having corresponding piping from stage to stage are provided at the end of each first vapor space or condensation channel 20.

FIG. 4 shows in a schematic part representation a further exemplary membrane distillation apparatus 10 having two condensation/evaporation stages 12 arranged vertically beneath one another and respectively comprising an integrated preheating device 28.

In the present case, the vapor flows from a respective second vapor space 24 of the upper first condensation/evaporation stage 12 directly, i.e. without deflection, vertically into a respective first vapor space or condensation channel 20 of the lower second condensation/evaporation stage 12. A preheating device 28 is again integrated in each condensation/evaporation stage 12. In the present case, the liquid or solution 16 to be preheated and concentrated is conducted from bottom to top through the stages. In this respect, the liquid 16 to be concentrated is further heated in each further stage. After the last preheating in the preheating device 28 associated with the upper first condensation/evaporation stage 12, the preheated liquid 16 to be concentrated is then supplied to this upper first condensation/evaporation stage 12 as the liquid or solution 16 to be concentrated by evaporation.

FIG. 5 shows in a schematic part representation a membrane distillation apparatus 12 comparable with that of FIG. 4, with the disposal of non-condensable gases additionally being shown. A corresponding disposal of non-condensable gases can also be provided in the previously described embodiments, but is not shown for reasons of better clarity. The same reference numerals are associated with mutually corresponding parts of the different embodiments.

FIG. 6 shows in a schematic part representation a membrane distillation apparatus 12 comparable with FIG. 5, wherein in the present case a siphon 44 is provided as a pressure equalization device whose rising part comprises expansion channels 46 which are each bounded by at least one membrane 48.

The expansion channels 45 therefore form at least a part of the siphon 48. In the present case, such a pressure equalization device comprising a siphon is shown between the upper first stage and the subsequent second stage arranged thereunder. In principle, such a pressure equalization device can, however, also be provided between any desired preceding condensation/evaporation stage and a directly following condensation/evaporation stage.

As can be recognized with reference to FIG. 6, the distillate flows from below through the expansion channels 46 which form the or a part of the rising part of the siphon 44. The expansion channels 46 are at the pressure of the lower second condensation/evaporation stage 12 so that the distillate from the upper first condensation/evaporation stage 12, which has a higher pressure than the second stage, can expand abruptly while forming vapor. The vapor produced in this process can then flow through the respective membrane 48 into the respective first vapor spaces 20 of the lower second condensation/evaporation stage 12 and does not have to flow away upwardly as in a pipe. A siphoning empty of the siphon by vapor bubbles as in a pipe does not take place. The produced vapor condenses in the first vapor spaces or condensation channels 20 of the lower second condensation/evaporation stage 12. The produced condensate is supplied to the following third stage, not shown, via a corresponding pressure equalization device 44 or siphon as between the two first stages.

REFERENCE NUMERAL LIST 10 membrane distillation apparatus
12 condensation/evaporation stage
14 vapor from a vapor generator
14' vapor produced anew in a respective prestage
16 liquid to be concentrated
18 condensation wall
20 first vapor space
22 membrane wall
24 second vapor space
26 flow channel
28 preheating device
30 third vapor space
32 channel
34 heat-conductive, liquid-tight wall
36 horizontal collector channel
38 horizontal collector channel
40 vertical deflection channel section
42 condensate
44 pressure equalization device, siphon
46 expansion channel
48 membrane
K condensation unit
V evaporation unit

The invention claimed is:

1. A membrane distillation apparatus, comprising:
a plurality of condensation/evaporation stages which are consecutively flowed through by a liquid to be concentrated, each of the plurality of condensation/evaporation stages comprising a plurality of condensation units and a plurality of evaporation units, wherein:
a first condensation/evaporation stage of the plurality of condensation/evaporation stages, arranged in a main direction of flow of the liquid to be concentrated, is acted on by vapor of a vapor generator, and
a second condensation/evaporation stage of the plurality of condensation/evaporation stages, disposed downstream of the first condensation/evaporation stage arranged in the main direction of flow of the liquid to be concentrated, is acted on by the vapor produced in the first condensation/evaporation stage of the plurality of condensation/evaporation stages,
wherein a respective condensation unit comprises a first vapor space, which is bounded at least partly by a condensation wall and which is acted on by the supplied vapor, and
wherein a respective evaporation unit comprises a second vapor space, which is bounded at least partly by a vapor-permeable, liquid-tight membrane wall, and
wherein a respective flow channel is provided in a respective condensation/evaporation stage between the condensation unit of the respective condensation/evaporation stage and the evaporation unit of the respective condensation/evaporation stage adjacent thereto, and the respective flow channel conducts the liquid to be concentrated so that the liquid to be concentrated is heated via the condensation wall and so that vapor produced from the liquid to be concentrated enters the second vapor space through the membrane wall,
wherein each of the condensation/evaporation stages is respectively expanded by an integrated device for preheating the liquid to be concentrated,
wherein the integrated device comprises a plurality of third vapor spaces, which are spaced apart from the first vapor spaces, the plurality of third vapor spaces being acted on by the vapor supplied from a respective upstream condensation/evaporation stage and in which the vapor condenses, whereby the liquid to be concentrated is preheated,
wherein each of the condensation/evaporation stages is respectively acted on by the vapor of the vapor generator or the respective upstream condensation/evaporation stage via a horizontal collector channel, and
wherein the horizontal collector channel is configured to apply the vapor to both the first vapor spaces and to the third vapor spaces of the respective condensation/evaporation stage.

2. The membrane distillation apparatus in accordance with claim 1,
wherein the preheating devices each comprise a plurality of channels which conduct the liquid to be preheated and concentrated and which are each at least partly bounded by at least one heat-conductive, liquid-tight wall.

3. The membrane distillation apparatus in accordance with claim 2,
wherein the at least one heat-conductive, liquid-tight wall is provided in the form of a planar surface of a pipe or of a hollow fiber.

4. The membrane distillation apparatus in accordance with claim 1, wherein:
the liquid to be preheated and concentrated is first supplied to the preheating device of a last condensation/evaporation stage of the plurality of condensation/evaporation stages, arranged in the main direction of flow of the liquid to be concentrated, and is subsequently supplied consecutively to the preheating device of the respective upstream condensation/evaporation stage before the preheated liquid to be concentrated is supplied to the at least one flow channel of the first condensation/evaporation stage conducting the liquid to be concentrated.

5. The membrane distillation apparatus in accordance with claim 1, wherein the plurality of condensation/evaporation stages is arranged horizontally next to one another.

6. The membrane distillation apparatus in accordance with claim 1,
wherein the plurality of condensation/evaporation stages is arranged vertically beneath one another.

7. The membrane distillation apparatus in accordance with claim 6,
wherein the vapor produced in a respective upstream condensation/evaporation stage of the plurality of condensation/evaporation stages is supplied to the respective subsequent condensation/evaporation stage via parallel, horizontal collector channels which are connected to one another by a vertical deflection channel section.

8. The membrane distillation apparatus in accordance with claim 1, wherein the vapor produced in a respective upstream condensation/evaporation stage of the plurality of condensation/evaporation stages is vertically supplied to a respective downstream condensation/evaporation stage of the plurality of condensation/evaporation stages.

9. The membrane distillation apparatus in accordance with claim 6, wherein a collected condensate produced in the condensation units of a respective upstream condensation/evaporation stage of the plurality of condensation/evaporation stages is supplied to a respective downstream condensation/evaporation stage of the plurality of condensation/evaporation stages via a pressure equalization device.

10. The membrane distillation apparatus in accordance with claim 9,
wherein the pressure equalization device comprises a siphon.

11. The membrane distillation apparatus in accordance with claim 10,
wherein a rising part of the siphon comprises expansion channels which are bounded by at least one membrane.

* * * * *